Sept. 26, 1967 E. BELLEM 3,344,354

TUNNEL DIODE AMPLITUDE LIMITER CIRCUIT

Filed Feb. 24, 1964

INVENTOR
EDWARD BELLEM
BY Smart & Biggar
ATTORNEYS.

United States Patent Office 3,344,354

Patented Sept. 26, 1967

3,344,354

TUNNEL DIODE AMPLITUDE LIMITER CIRCUIT

Edward Bellem, Ottawa, Ontario, Canada, assignor to Northern Electric Company Limited, Montreal, Quebec, Canada Filed Feb. 24, 1964, Ser. No. 346,689
8 Claims. (Cl. 325—348)

ABSTRACT OF THE DISCLOSURE

An amplitude limiter circuit utilizing, as the non-linear elements, a pair of oppositely poled tunnel diodes connected in parallel and biased so that one of the diodes is in a stable high voltage state while the other is in a stable low voltage state. The circuit comprises input and output connections, a resistor connected in series between one of the input and one of the output connections and the diodes connected effectively in shunt with the output connections.

This invention relates to an amplitude limiter circuit, and more particularly to a limiter circuit employing tunnel diodes.

Limiter circuits are used in frequency modulation transmission systems for suppressing undesirable amplitude variations of a frequency modulated carrier signal before detection in the discriminator of a receiver. One type of limiter circuit utilizes a pair of oppositely poled conventional diodes placed in parallel with the signal path of the circuit. In many applications, at least one of these diodes is reversed biased so that clipping or limiting of the frequency modulated signal will not begin until a threshold signal level is reached.

One of the problems encountered, particular in wide band FM systems is that with varying signal levels being applied to the limiter circuit, the reduction in amplitude variations is accompanied by a conversion of amplitude modulation to phase modulation (AM to PM conversion). This latter modulation is indistinguishable from frequency modulation and therefore results in undesirable distortion or noise appearing at the discriminator output.

Another problem, which is particularly apparent in high quality frequency modulation systems is that random noise appears at the output of the receiver during temporary loss of the carrier signal or while an operator in tuning between various stations in the frequency band. A number of circuits have been developed for overcoming this problem including squelch circuits which automatically suppress the output signal of the receiver when the carrier signal falls below the threshold level. These squelch circuits do not generally form an inherit part of the limiter circuits in the receiver and thus increase the overall cost.

These disadvantages have been overcome in the present invention by providing an amplitude limiter circuit comprising a pair of oppositely poled tunnel diodes connected effectively in parallel across the circuit. A direct current source of biasing potential is connected in series with the diodes so that one of the diodes is biased in a stable low voltage state when the other is biased in a stable high voltage state. A carrier signal, applied to input connections of the limiter circuit, is coupled across the tunnel diodes through an isolating impedance which at least partially decouples the diodes from the preceding driver stage. The excursions of the signal voltage alternately switch the tunnel diodes from a low voltage state to a high voltage state thereby resulting in a substantially constant amplitude square wave signal voltage across the diodes. Thus an output signal having substantially reduced amplitude variations is obtained. When the carrier signal coupled to the limiter circuit falls below a predetermined level, there is insufficient drive to switch the state of conduction of the tunnel diodes and they therefore remain substantially in a static condition. As a result, there is virtually no output signal from the limiter circuit and consequently very little output from the detector of the FM receiver. By proper adjustment of the bias voltage applied across the diodes, this provides inherent noise suppression or squelch action when the carrier signal falls below the threshold level.

To obtain a reduction in AM to PM conversion, a resistor is placed in shunt with the diodes. This reduction in conversion can also be accomplished by a judicious choice of the isolating impedance in conjunction with the source impedance of the driver stage preceding the limiter circuit. This results in an effective loading of the tunnel diodes and thus accomplishes the same result as the resistor placed in shunt with them.

Example embodiments of the invention will now be described with reference to the accompanying drawings in which.

Figure 1:
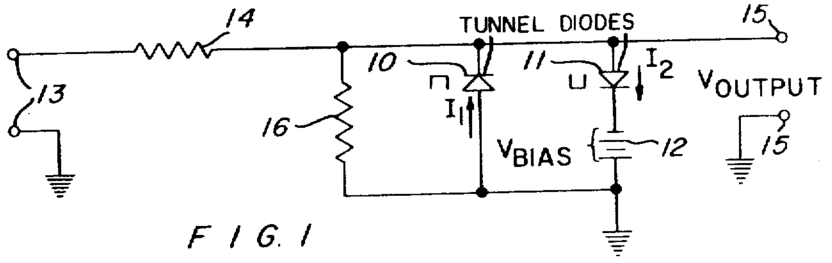
FIGURE 1 is a schematic circuit diagram of an amplitude limiter circuit in accordance with the present invention.

Referring now to FIGURE 1 of the drawings, the amplitude limiter circuit comprises a pair of oppositely poled tunnel diodes 10 and 11 connected effectively in parallel across the circuit and in series with a source of biasing potential 12. An input signal is applied to input connections 13 and is coupled to the junction of the two diodes 10 and 11 through a resistor 14 which acts as an isolating impedance. The resultant output signal across the diodes 10 and 11 is coupled directly to output connections 15. To reduce AM to PM conversion, a resistor 16 is placed in shunt with the two diodes 10 and 11. The source of direct current biasing potential 12 is adjusted so that in the absence of an input signal one of the tunnel diodes (for instance diode 10) is operating in a stable low voltage state when the other tunnel diode (in the present instance diode 11) is operating in a stable high voltage state.

Figure 2:
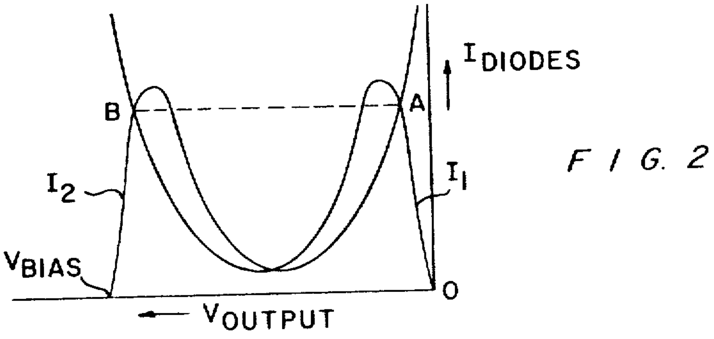
FIGURE 2 is a current-voltage graph showing the operation of the amplitude limiter circuit of FIGURE 1.

Operation of the amplitude limiter circuit can be better understood by referring to the current-voltage graph illustrated in FIGURE 2 of the drawings. The characteristics of the two tunnel diodes 10 and 11 have been superimposed on each other in order to illustrate that in the absence of an input signal the current through the diodes 10 and 11 will be equal. In addition, the sum of voltages across the two diodes will equal the bias potential of the source 12 ($V_{bias}$). To provide maximum sensitivity for the limiter circuit, the bias current is adjusted slightly below the tunnel diode peak current. The voltage across the output terminals 15 will stabilize at either point A or point B depending upon the state of conduction of the two diodes 10 and 11.

Let us assume that the circuit has stabilized at point A. On the first negative going excursion of the input signal applied to the input connections 13, the current through the tunnels diodes 10 and 11 will increase and decrease respectively. If the input signal is of sufficient amplitude, the diodes 10 and 11 will rapidly switch from one state of conduction to the other as soon as the total current through the diode 10 exceeds the peak current. Due to the high conductance of the two diodes 10 and 11 at point B with respect to the resistor 14, a further increase of the negative going excursion will result in a relatively small increase in the output signal voltage. Conversely, a positive going excursion of the input signal voltage will result in the two diodes 10 and 11 again switching their state of condition. Thus the signal voltage across the output connections 15 is alternatively switched between points A and B at the signal frequency rate and an essentially constant amplitude square wave is produced. Hence, amplitude variations are effectively reduced by the limiter circuit.

Since the bias current, supplied by the source 12 is flowing through the two tunnel diodes, 10 and 11, the input signal current necessary to switch the state of conduction is only a fraction of the tunnel diode peak current. Hence a sensitive balanced switch is obtained.

If the input signal voltage is below the threshold level, that is below the level required to switch the state of conduction of the tunnel diodes 10 and 11, the output signal voltage level will remain virtually static, at either points A or B. Thus there is an inherent squelch action in the limiter circuit of the present invention. Measurements have indicated that noise reductions of up to 30 db have been obtained, in the absence of a carrier signal at the receiver input, when a conventional diode limiter is replaced by the tunnel diode limiter of the present invention.

It has been found that a significant reduction in the conversion of amplitude modulation to phase modulation is achieved when the resistor 16 is shunting the two diodes 10 and 11. Empirical results have indicated that a minimum conversion can be obtained by optimizing the biasing potential ($V_{bias}$) from the source 12 and the value of this resistor 16.

As an example the following characteristics and component values were found experimentally to yield satisfactory results:

| | | |
|---|---|---|
| $V_{bias}$, source **12** | volt | 0.5 |
| Resistor **14** | ohms | 150 |
| Resistor **16** | do | 75 |

The exact reasons for the reduction in AM to PM conversion are not fully understood but it is believed that the compensation is obtained through longer switching delay at higher tunnel diode currents. The resistor 16 will affect the distribution of currents through the resistors 14 and 16 and the diodes 10 and 11 and thus determine the time delay when the diodes 10 and 11 switch from one state of conduction to the other.

Figure 3:
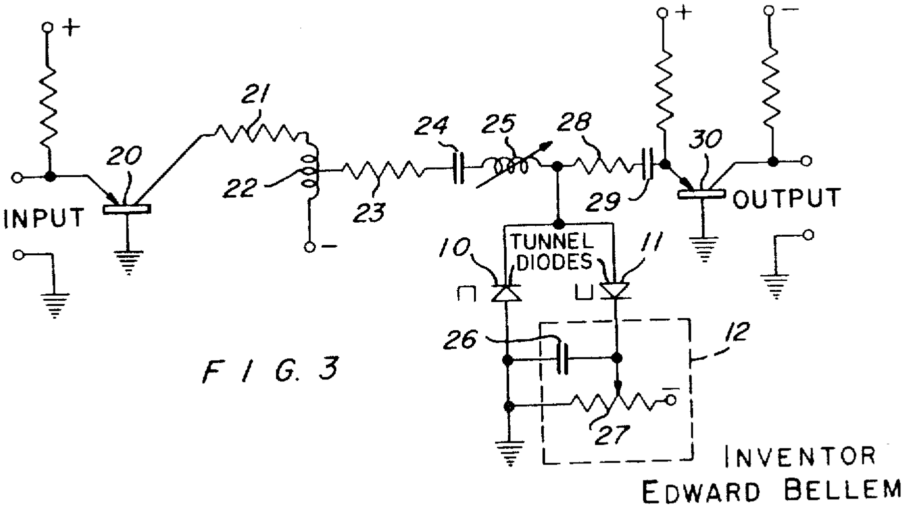
FIGURE 3 is a schematic circuit diagram of an amplitude limiter circuit in accordance with one specific embodiment of the invention.

FIGURE 3 of the drawings illustrates a schematic circuit diagram of a specific embodiment of an amplitude limiter circuit which provided satisfactory results at a signal frequency of 70 megacycles.

The input signal is applied to the emitter of a transistor 20 connected in a grounded base configuration. The output signal from the collector of the transistor 20 is coupled through a resistor 21 to an impedance transformer 22. The output signal from the center tap of the impedance transformer 22 is coupled through a resistor 23, a coupling capacitor 24 and a variable inductance 25 to the junction of the two oppositely poled diodes 10 and 11 which are effectively connected in parallel with the circuit. Connected in series wtih the diodes is the source of biasing potential 12 which includes a bi-pass capacitor 26 and a potentiometer 27 used for setting the bias current. The output signal is coupled from the junction of the two diodes 10 and 11 through a resistor 28 and a coupling capacitor 29 to the emitter of a transistor 30, also connected in a grounded base configuration.

In this embodiment the isolating impedance, illustrated as a resistor in FIGURE 1, is provided by the resistor 23 and the variable inductor 25 in conjunction with the impedance transformer 22 and the resistor 21. As herebefore mentioned, the conversion of amplitude modulation to phase modulation can be reduced by placing a compensating resistor in shunt with the tunnel diodes 10 and 11. This resistor can be dispensed with if a judicious choice of loading is provided by the isolating impedance and the source and load impedances. In the present embodiment, the values of the resistors 21, 23, and 28 and the variable inductance 25 are selected to provide minimum AM to PM conversion. The final optimum setting is obtained by varying the resistance of the potentiometer 27 and hence the bias current, and the inductance of the variable inductor 25.

Typical values and characteristics of the components used in this embodiment are as follows:

| | | |
|---|---|---|
| Capacitors **24**, **26** and **29** | μμfd | 1000 |
| Inductor **25** | μH | 0.4–0.5 |
| Potentiometer **27** | ohms | 100 |
| Resistor **21** | do | 27 |
| Resistor **23** | do | 33 |
| Resistor **28** | do | 100 |
| Transformer **22** | | [1] 4:1 |

[1] Impedance ratio.

What I claim as my invention is:

1. An amplitude limiter circuit comprising input and output connections for connecting an alternating current signal thereto and therefrom respectively, an isolating impedance connected between one of said input and output connections, a pair of oppositely poled tunnel diodes connected effectively in parallel across said output connections, a biasing means connected in series with said diodes so that one of said diodes is conducting in a stable low voltage state when the other diode is conducting in a stable high voltage state, whereby said diodes alternate states in response to the excursions of the signal voltage when said signal is above a predetermined amplitude.

2. An amplitude limiter circuit as defined in claim 1 which includes a further impedance connected effectively in shunt with said diodes to reduce the conversion of amplitude modulation to phase modulation in the limiter circuit.

3. An amplitude limiter circuit as defined in claim 2 in which said isolating impedance and said further impedance are first and second resistors respectively.

4. An amplitude limiter circuit as defined in claim 1 in which the impedance of the isolating impedance, the impedance of a source connected to said input connections and the impedance of a load connected to said output connections are selected so as to substantially reduce the conversion of amplitude modulation to phase modulation in said limiter circuit.

5. An amplitude limiter circuit comprising:
   - a pair of input connections for connecting an alternating current signal of varying amplitude thereto;
   - a pair of output connections for connecting the alternating current signal having substantially reduced amplitude variations therefrom;
   - a pair of oppositely poled tunnel diodes each connected effectively in shunt with said output connections;
   - direct current biasing means connected in series with said diodes of such predetermined amplitude that one of said diodes is biased in a stable low voltage state and the other diode is biased in a stable high voltage state, or said other diode is biased in a stable low voltage state and said one diode is biased in a stable high voltage state; and
   - an isolating impedance connected between one of said input connections and one of said output connections, the other input connection being connected to the other output connection, whereby said diodes alternate states in response to alternate excursions of the alternating current signal voltage.

6. An amplitude limiter circuit as defined in claim 5 which includes a further impedance connected effectively in shunt with said diodes to substantially reduce the conversion of amplitude modulation to phase modulation in the limiter circuit.

7. An amplitude limiter circuit as defined in claim 6 in which said isolating impedance and said further impedance are first and second resistors respectively.

8. An amplitude limiter circuit as defined in claim 5 in which the impedance of the isolating impedance, the impedance of a source connected to said input connections and the impedance of a load connected to said output connections are selected so as to substantially reduce the conversion of amplitude modulation to phase modulation in said limiter circuit.

References Cited

UNITED STATES PATENTS

| | | | |
|---|---|---|---|
| 3,092,734 | 6/1963 | Theriault | 307—88.5 |
| 3,163,717 | 12/1964 | Loughlin | 329—13 X |

KATHLEEN H. CLAFFY, *Primary Examiner.*

R. S. BELL, *Assistant Examiner.*